United States Patent [19]

Ridett

[11] Patent Number: 5,048,507

[45] Date of Patent: Sep. 17, 1991

[54] ENDOTHERMIC BUILDING

[76] Inventor: Alan H. Ridett, 42a High Street, Newport, Isle of Wright, England, P030 1SF

[21] Appl. No.: 475,174

[22] Filed: Feb. 5, 1990

[30] Foreign Application Priority Data

Feb. 7, 1989 [GB] United Kingdom ................. 8902662

[51] Int. Cl.$^5$ ............................................ E04D 13/18
[52] U.S. Cl. .................................. 126/430; 126/436; 126/427; 126/428; 126/431
[58] Field of Search ............... 126/430, 431, 427, 428, 126/436; 165/48.2

[56] References Cited

U.S. PATENT DOCUMENTS

| | | | |
|---|---|---|---|
| 4,259,401 | 3/1981 | Chahroudi et al. | 126/430 X |
| 4,383,521 | 5/1983 | Bounds | 126/430 |
| 4,467,859 | 8/1984 | Carroll et al. | 126/430 X |
| 4,602,676 | 7/1986 | Bergeron, Jr. | 126/430 X |
| 4,663,897 | 5/1987 | Ridett | 126/428 X |

FOREIGN PATENT DOCUMENTS 272538 12/1986 Japan .................................. 126/430

*Primary Examiner*—Larry Jones
*Attorney, Agent, or Firm*—Plante, Strauss, Vanderburgh & Connors

[57] ABSTRACT

With reference to FIG. 3, the sloping roof (250) of a building (10) incorporates inner and outer juxtaposed metal panels, (15, 16) spaced from each other to define passageways (20) which serve as heat exchangers. A closed-loop water circulation system (18) connects the passageway (20) with low, medium and high grade heat store chambers (21, 23, 25) disposed within the building foundation structure (13). The water circulation system (18) employs sub-systems (22, 29 and 31) which comprise, respectively, primary, secondary and tertiary sub-systems. The heat store chamber (21) comprises a portion of the primary circulation sub-system (22) whereby water is re-circulated through the panel passageways (20) so as to be raised in temperature 20 by solar heat. In addition to the heat store chamber (21), the primary sub-system (22) comprises a heat pump unit (27). The secondary water circulation sub-system (29) conveys water in a closed loop which, in addition to the heat store chamber (23), comprises the passageways (20) and the heat pump unit (27). The tertiary water sub-system (31) comprises the heat store chamber (25), radiators (19), underfloor heat exchanger coils (35) and a heat exchanger coil (37) incorporated in a hot water cylinder (39). Heat from water flowing in the primary sub-system (22) is given up to the heat store chamber (21) and also to the heat pump unit (27). Heat from water flowing in the secondary sub-system (29) is given up to the heat store chamber (23), as well as to the heat pump unit (27). A controller (40) is operable to provide controlled transfer of heat between the sub-systems (22, 29, 31).

13 Claims, 6 Drawing Sheets

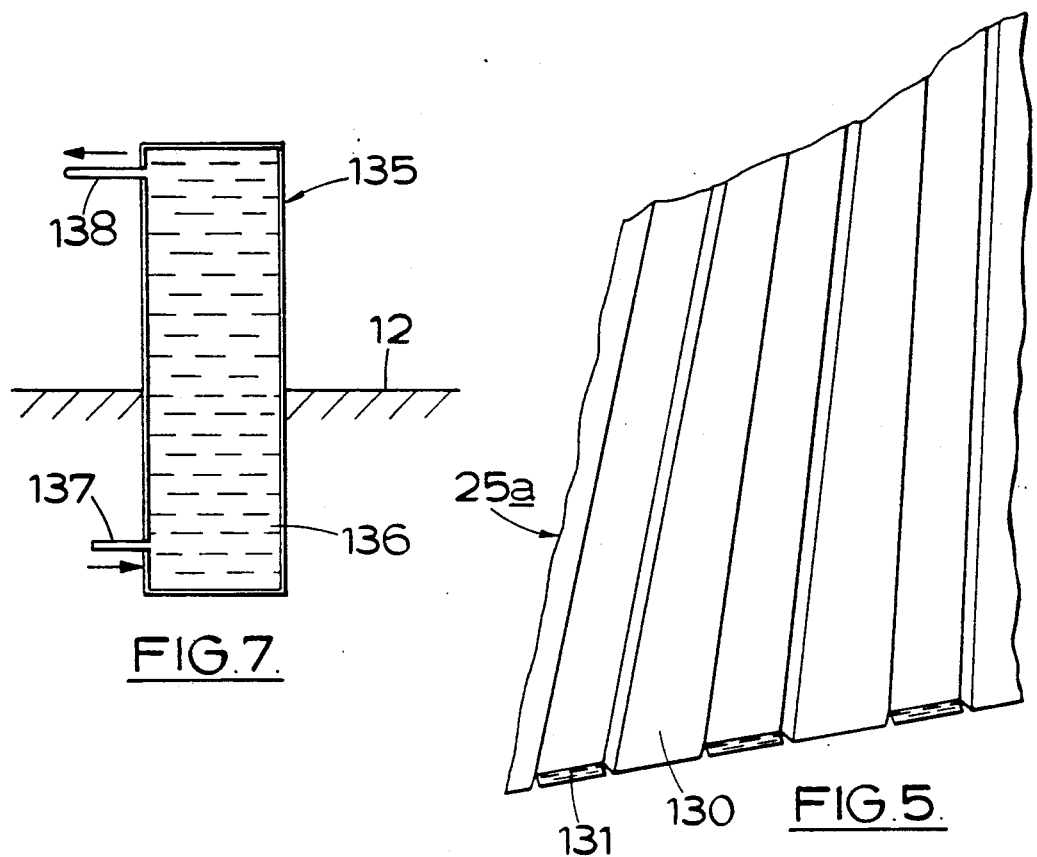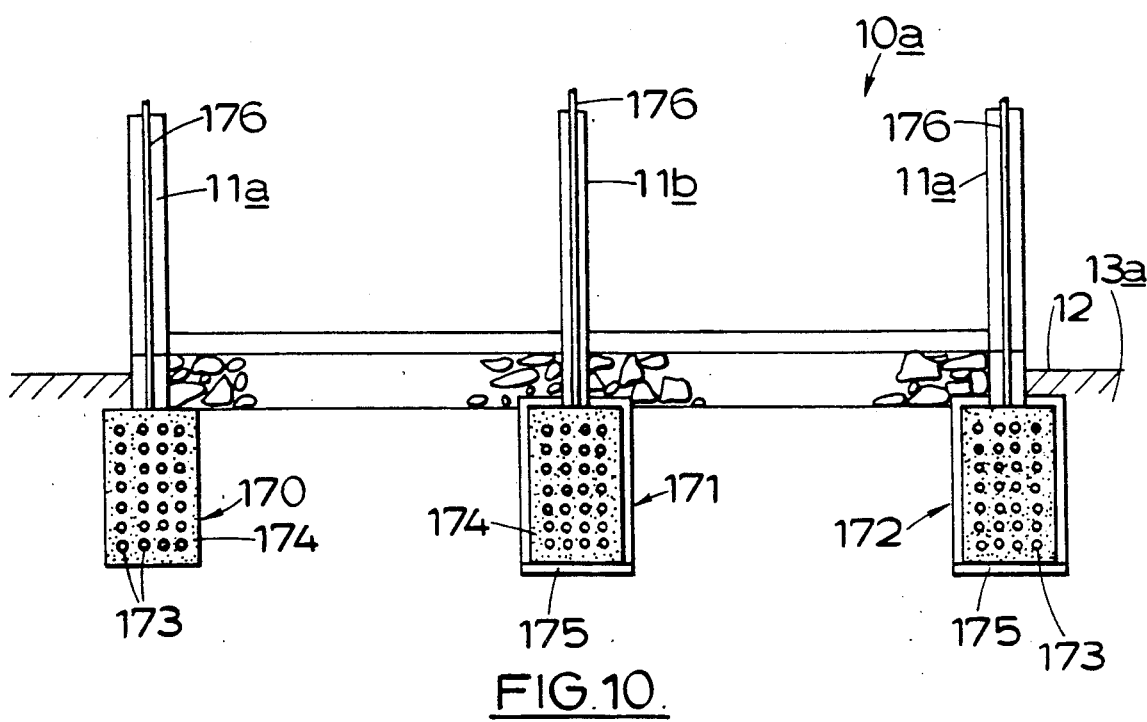

ENDOTHERMIC BUILDING

BACKGROUND TO THE INVENTION

This invention relates to buildings, and is particularly concerned with the heating thereof.

Applicant's UK Patent No. 2,102,468 (U.S. Pat. No. 4,663,897 corresponds) discloses a building which includes a hollow load-bearing structure serving as a water reservoir divided by partitioning means into a low grade heat store and a high grade heat store. The building has cladding in the form of panels, which may be incorporated in the roof structure of the building. A water circulation system conveys water heated by heat transfer from the cladding to and from a heat sink. A heat pump is operative to abstract heat at low temperatures from the heat sink.

SUMMARY OF THE PRESENT INVENTION

According to the present invention, a building is provided with solar heated heat exchanger means, heat store means and a circulation system operable to convey a heat transfer fluid around a path connecting the heat exchanger means and the heat store means.

As used herein, the term -solar heat- is not confined to heat applied directly by the sun. It also includes other ambient heat which may be available, including heat available from the soil.

The building may be of the form described and illustrated by the said UK Patent No. 2,102,468.

BRIEF DESCRIPTION OF THE DRAWINGS

An embodiment of the invention will now be described, by way of example only, with reference to the accompanying drawings, wherein:

FIG. 10 illustrates a further modifification.

In the figures, like reference numerals relate to like features and components.

DETAILED DESCRIPTION OF THE PREFERRED EMBODIMENT

Figure 1:
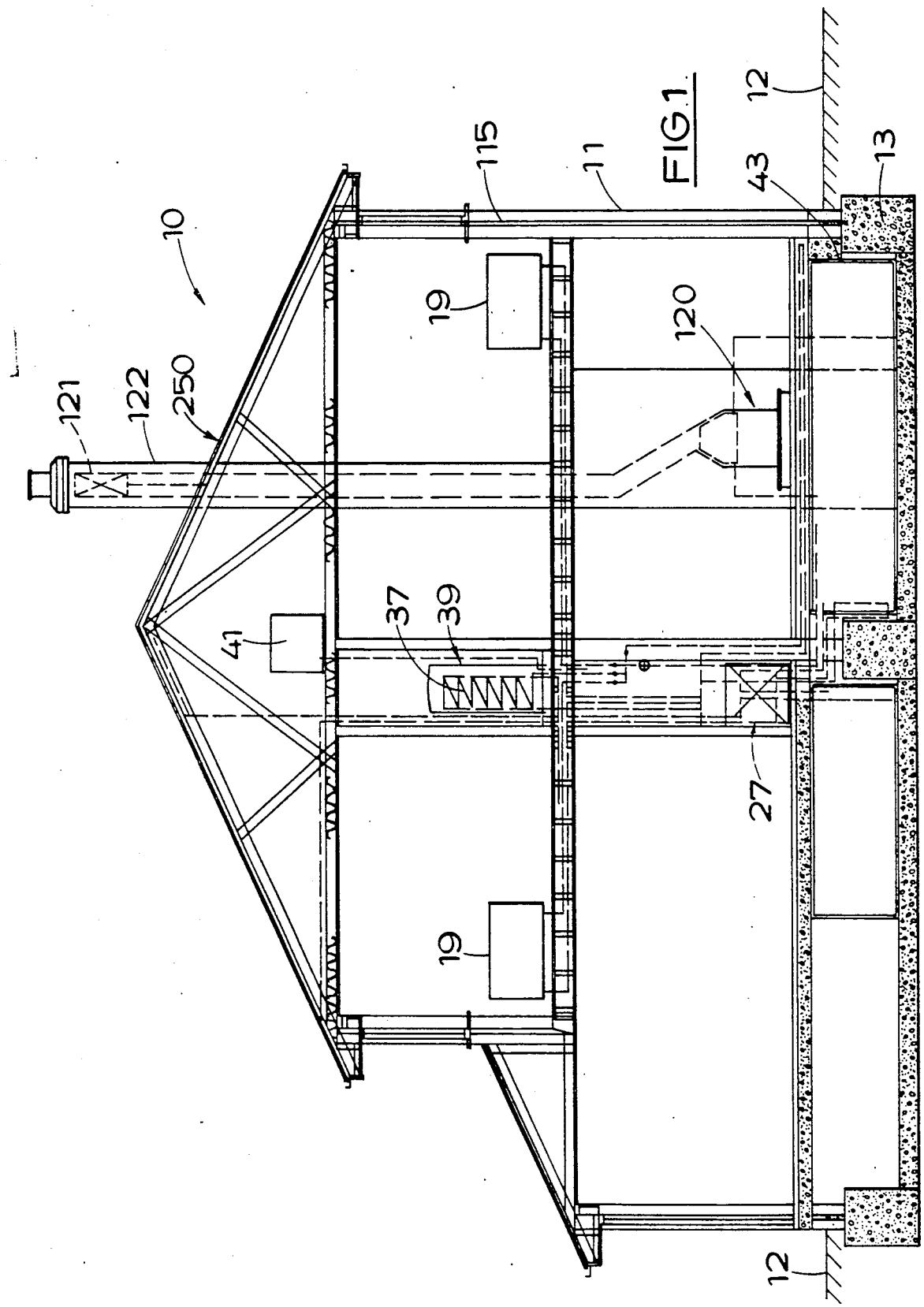
FIG. 1 is an end view, in section, of a building.

Referring to FIG. 1, to the left hand half of FIG. 2 and to FIG. 3, a building 10 in the form of a house is shown which is of traditional construction, having structural brick and block cavity walls 11 supported at their bottoms by an underlying cementitious (concrete) foundation structure 13 embedded in the ground, below ground level 12. The foundation structure 13, the mass of which is about 100 tons in order to increase the thermal mass (if required) of the building, is hollow, defining enclosures 17a, 17b, 17c, 17d, 17e (FIG. 2) which are rectangular in vertical cross-section. The enclosures 17a, 17b, 17c house three discrete mutually-isolated water-filled chambers 21, 23, 25. Enclosures 17d, 17e of this example are empty, but may be used if desired. The chambers 21, 23, 25 comprise metal tanks, and together serve as heat store means.

The sloping roof 250 of the building 10 incorporates a cladding in the form of inner and outer juxtaposed metal panels, 15, 16. The undersides of the inner panels 15 are sprayed with urethane foam insulation 50 mm thick. The panels 15, 16, which are spaced from each other to define ducts or passageways 20, serve as heat exchanger means.

A closed-loop water circulation system 18 (FIG. 3) is provided which connects the passageways 20 defined by the panels 15, 16 with the heat store chambers 21, 23 disposed within the foundation structure 13. The system 18 also includes the heat store chamber 18 and associated pipework. The structure 13 may serve as a heat store, as explained hereinafter.

The circulation system 18 is operable to convey water along pipework or conduits in a closed path or loop which includes the panel passageways 20 and upper and lower headers 30, 32, which are connected to opposite ends of the passageways 20. The water contains antifreeze and corrosion inhibiting chemicals.

Solar heat taken up at the outer panels 16 is transferred by both conduction and convection to water flowing through the panel passageways 20, in the course of circulation around the system 18. The water thus serves as a heat transfer fluid.

The circulation system 18 also includes radiators 19, and underfloor heating coils 35, which dissipate heat transferred thereto by the heated water. The system 18 also includes a domestic hot water cylinder 39, and a cold water header tank 41 (FIG. 1) connected thereto.

The water circulation system 18 comprises three circulation subsystems, namely sub-systems 22, 29 and 31 which comprise, respectively, primary, secondary and tertiary sub systems. The heat store chamber 21 comprises a portion of the primary circulation sub-system 22 whereby water is circulated through the panel passageways 20 in a closed loop so as to be raised in temperature by solar heat.

In addition to the heat store chamber 21, the primary sub system 22 comprises a water to water heat pump means in the form of a heat pump unit 27, operating on a refrigerating or cooling cycle. The secondary water circulation sub-system 29 conveys water in a closed loop which, in addition to the heat store chamber 23, comprises the passageways 20 of the roof 250 as well as the heat pump unit 27.

The tertiary water sub-system 31 comprises the heat store chamber 25, the radiators 19, the underfloor heat exchanger coils 35 and a heat exchanger coil 37 incorporated in the hot water cylinder 39. The cylinder 39 comprises an indirect heating system for the supply of domestic hot water.

A controller means 40 is operable to provide controlled transfer of heat between the sub-systems 22, 29, 31 and comprises motorised valves and associated conduits, pumps and timers. See FIG. 9 which illustrates these components, except for the timers.

Thermostats 80, 81, 82 are fitted in the heat store chambers 21, 23, 25 and are connected to the controller 40 by electrical signal lines 83, 84, 85 respectively. A thermostat 86 is fitted in the hot water tank 39 and is connected to the controller 40 by an electrical signal line 87. A thermostat 88 is fitted in the roof header 30 and another thermostat 90 is disposed in the hall of the house 10. The thermostats 88, 90 are connected to the controller 40 by electrical signal lines 91, 92 respectively.

The separate heat store chambers 21, 23, 25 are in thermal contact with the concrete foundation structure 13 whereby the structure 13 can receive heat from the heat store chambers, or transfer heat thereto. The heat store chambers 21, 23, 25 comprise, relative to each other, low (−5° C. to 25° C.), medium (20° C. to 30° C.) and high (50° C. to 60° C.) heat stores.

The controller 40 can be set to operate as follows:

When water in the passageways 20 present in the roof 25 is collecting solar heat, all heat collected at a temperature above that of the water in the low grade heat store chamber 21 (say 25° C.) is passed to chamber 21. Should the roof passageways 20 collect heat above 25° C., the excess heat is passed to water present in the medium grade heat store chamber 23. If the medium grade heat store chamber 23 is at a temperature less than 25° C. between 10 am and 10 pm, the above-mentioned timers cause the heat pump unit 27 to extract heat from water present in the low grade heat store chamber 21 and top up the heat of water present in the medium grade heat store chamber 23.

At night, from midnight to 7 am, the timers cause the heat pump unit 27 to extract heat from water present in the medium grade heat store chamber 23 and to top up heat in water present in the high grade heat store chamber 25. The water flows ensure that the hot water cylinder 39 and the high grade heat store chamber 25 are up to temperature by 7 am each morning. Central heating and domestic water heating provided by sub-system 31 are supplied directly from the high grade heat store chamber 25.

Figure 3:
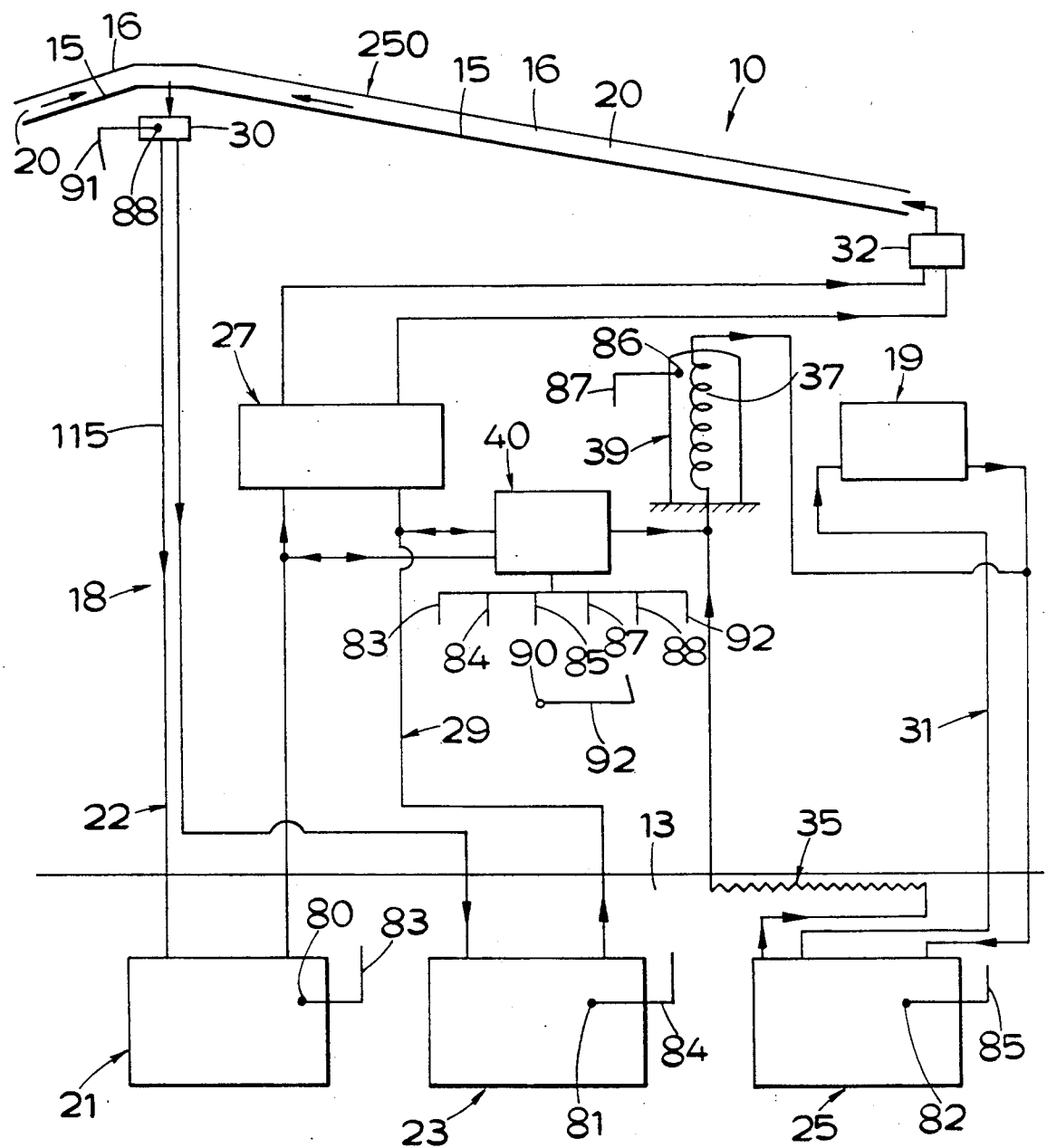
FIG. 3 illustrates, in a semi-diagrammatic manner, the water circulation system employed by the building, FIGS. 4, 5, 6, 7 and to 8 illustrate modifications.
Figure 9:
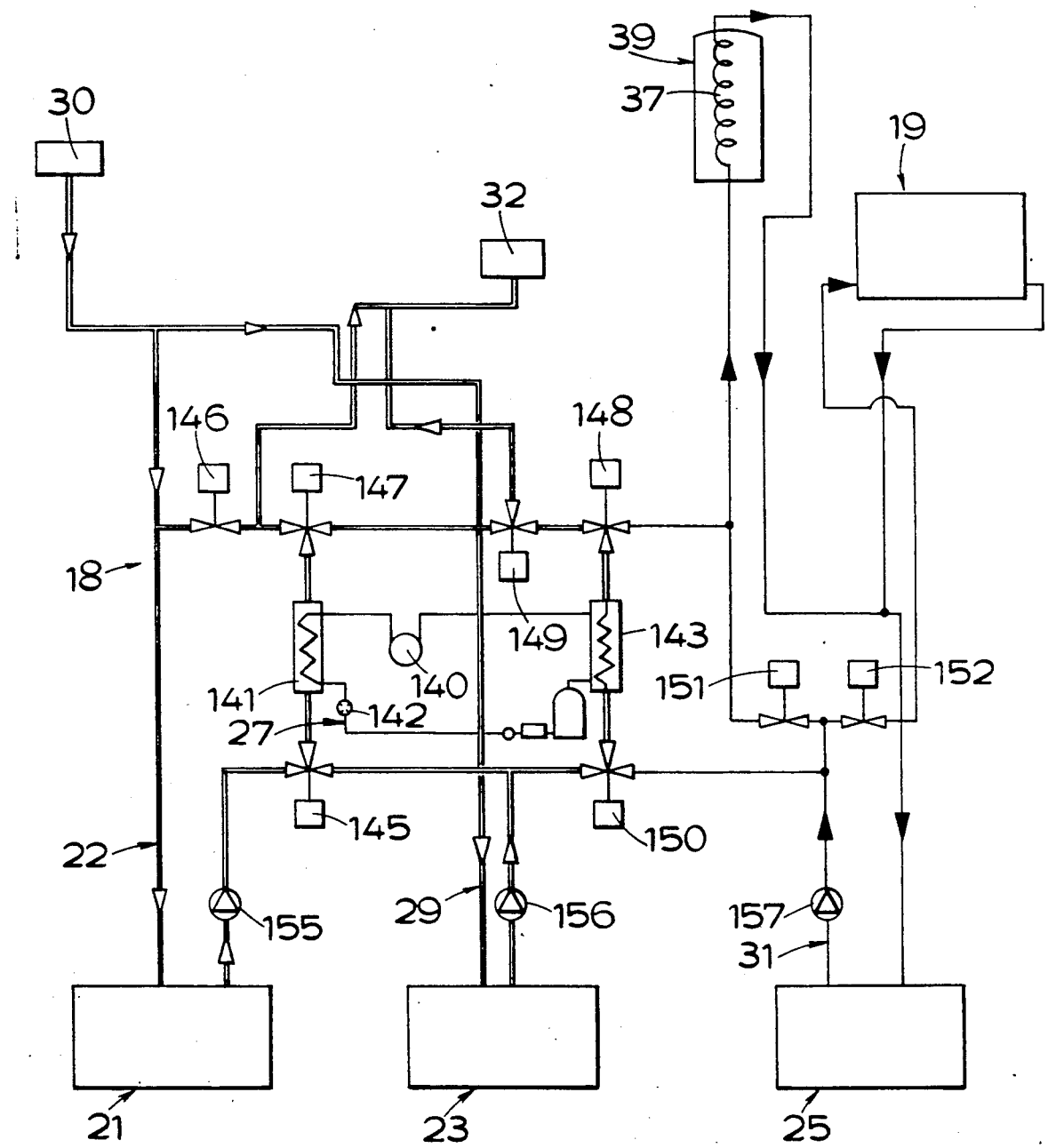
FIG. 9 illustrates further detail of the water circulation system of FIG. 3.

FIG. 9 illustrates, in some detail, as to how transfer of heat from one sub-system to another may be achieved by the controller 40 of FIG. 3.

The heat pump unit 27 is also shown. It has a compressor 140, an evaporator 141, an expansion valve 142, and a condenser 143.

Valves 145 to 152 are motorised valves under the control of the aforementioned timers (not shown) and thermostats 80 to 88.

Pumps 155 to 157 are provided, connected to the heat store chambers 21, 23, 25. The pumps also operate under timed control, as does the heat pump unit 27.

In order to keep FIG. 9 simple, the timers are not shown, neither are the connections between the thermostats 80 etc and associated equipment. However it will not present any difficulty to a person skilled in the art as to how the timers and the thermostats may be incorporated into the water circulation system 18 of FIG. 9.

It will be seen from FIG. 9 that closing one or more of the valves 145 to 152 and opening one or more of the remainder, can bring about the required transfer of water flow. For example, closing valve 146, at least partially, will allow heated water flowing from the header 30 to enter the medium grade heat storage chamber 23, so as to top up the heat present in water stored therein.

Also, by ensuring valves 145 to 152 inclusive are open, heat can be transferred from the medium grade heat store 23 to the high grade heat store 25.

There may be many weeks in the year when the heat pump unit 27 will only need to operate at night and the low grade heat store chamber 21 will not then be used. The entire system lends itself to operation and control by intelligent software for homes of the future.

Use of the heat pump unit 27 in association with the three heat store chambers 21, 23, 25 contributes to the thermal efficiency of the overall system 18. If the the medium grade heat store chamber 23 was not present, a heat pump unit larger than unit 27 would be required. Where only a single phase electrical supply is available, it would be necessary to use two heat pumps rather than a single large heat pump.

Figure 2:
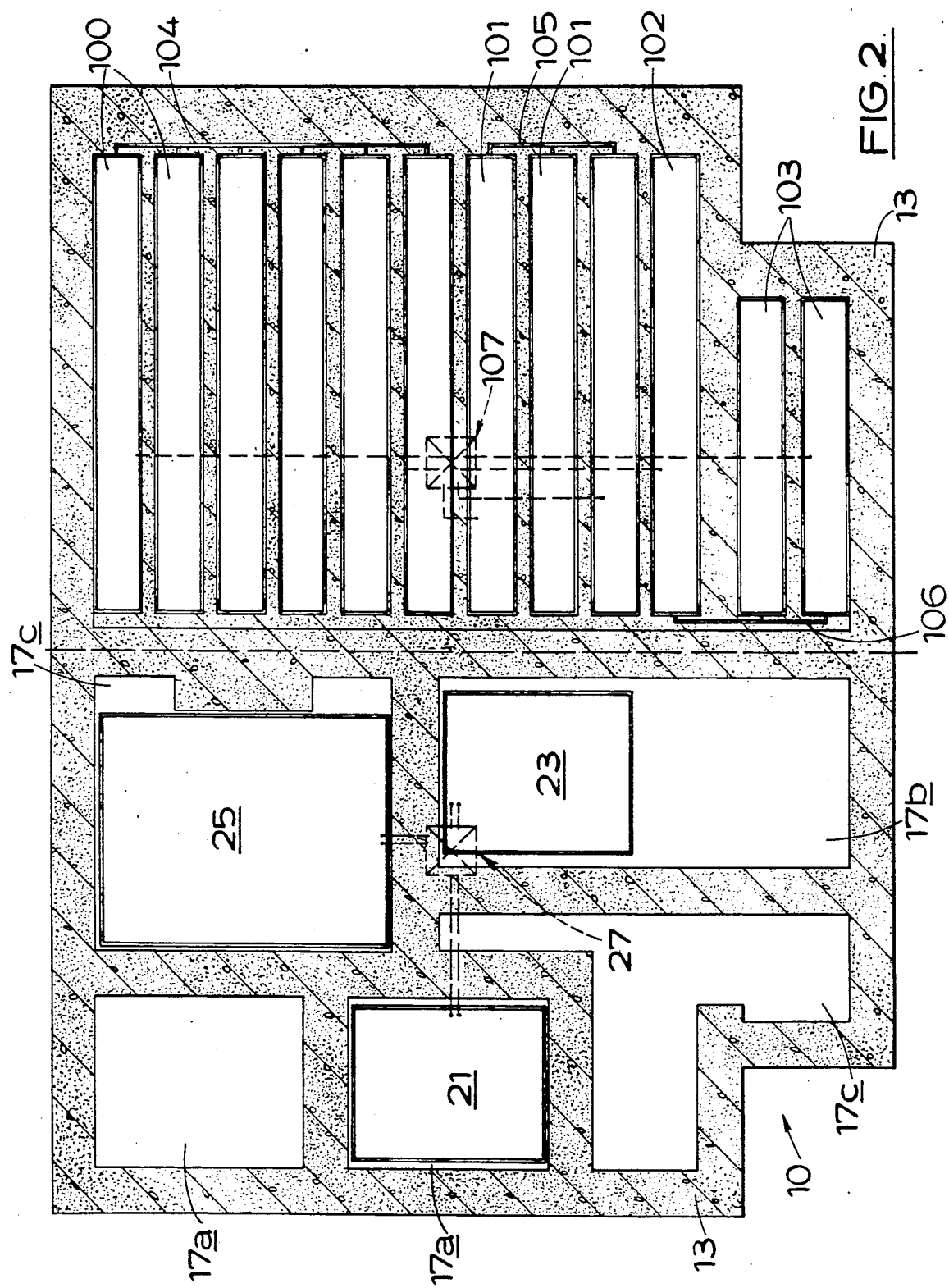
FIG. 2 is a foundation plan view of the building, and illlustrates two alternative arrangements.

With reference to the alternative heat store arrangement illustrated by the right-hand side of FIG. 2, the box-like heat store tank chambers, 21, 23, 25 may be replaced by three groups of cylindrical tank chambers, namely chambers 100, 101 and 102, 103.

The six chambers 100, which are interconnected by balancing pipes 104, comprise a high grade heat store. The three chambers 101, which are interconnected by balancing pipes 105, comprise a medium grade heat store. The relatively long single chamber 102, and relatively short two chambers 103, which are interconnected by balancing pipes 106, comprise a low grade heat store.

The heat store tank chambers 21, 23, 25 and/or the heat store chambers 100, 101, 102, 103 may be heat insulated from the surrounding concrete structure 13. Alternatively, some or all of the heat store chambers may not be so insulated, but instead caused to be in thermal contact with the concrete structure 13 whereby the structure 13 also serves as a heat store. It depends on whether more heat is lost or gained by a chosen arrangement.

The tubular tank chambers 100–104 may be of plastics material.

As shown in FIG. 2, an additional or alternative heat pump unit, namely unit 107, may be provided for use with the chambers 100–104.

Figure 4:
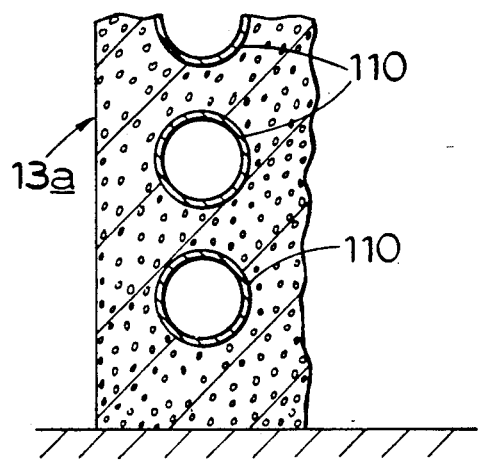

Another alternative heat store arrangement is illustrated by FIG. 4, wherein one or more tubes 110 of plastics material are coiled within a foundation structure 13a, being encapsulated by the surrounding concrete, which serves as a heat store. Three groups of encapsulated tubes 110 are preferably provided so as to form three heat stores corresponding to heat stores 21, 23, 25.

With reference once again to FIG. 1, conduits 115 conveying the water between the panel passageways 20 (see also FIG. 3) and the low grade heat store chamber 21 may, as shown, be incorporated in the structural walls 11 of the building 10.

An open fire 120 is provided. Associated therewith is a water circulating sub-system (not illustrated) operable whereby when the flue of the fire 120 is open, flue heat may be transferred to water in the low grade heat store, ie the chamber 21. When no fire is present, the flue is closed off.

A header tank 121 may be incorporated in the chimney 122 of the building 10, which tank serves to supply additional water, heated by hot chimney gases, to the panel passageways 20.

With reference to FIG. 5, panels 15, 16 (FIG. 3) may be replaced by single skin panels 130, the under-surfaces of which cover, and are in thermal contact with, a plurality of thin-walled ducts 131 of elongate, tubular form. The under-surfaces of a roof 25a comprising the panels 130 and ducts 131 may be coated with heat insulation material.

Figure 6:
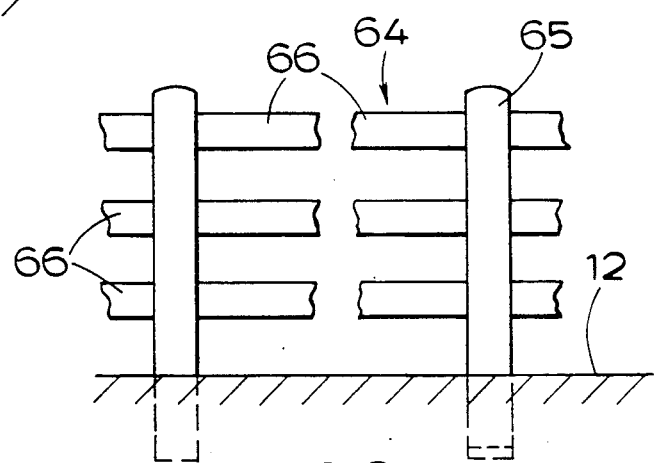

FIG. 6 shows an arrangement wherein an external heat exchanger in the form of a fence 64 is provided. The heat exchanger/fence 64, which may be used as a boundary around the land occupied by the building 10, comprises hollow posts 65 set in the ground and interconnected by hollow crossbars or rails 66. Water is circulated through the hollow interiors of the fence 64 to be raised in temperature by solar heat. The hollow interiors of the fence 64 are connected to the circulating system 18 (FIG. 3).

Hollow fence panels could be substituted for, or added to, the rails 66.

Hollow structures similar in appearance to the fence 64 could be used to protect walkways or to form balconies.

Any other suitably disguised artifact may be used to replace, or add to, the fence 64, as a heat exchanger. For example, with reference to FIG. 7, a simple large bore (say 1 metre diameter) tubular structure 135 may be inserted into the ground so that part of the structure is exposed to ambient heat from the air and the remainder to heat from the surrounding soil. The structure 135 is filled with water 136 and heat collected by the water is transferred to the system 18 (FIG. 3) by flow and return pipes 137, 138.

Figure 8:
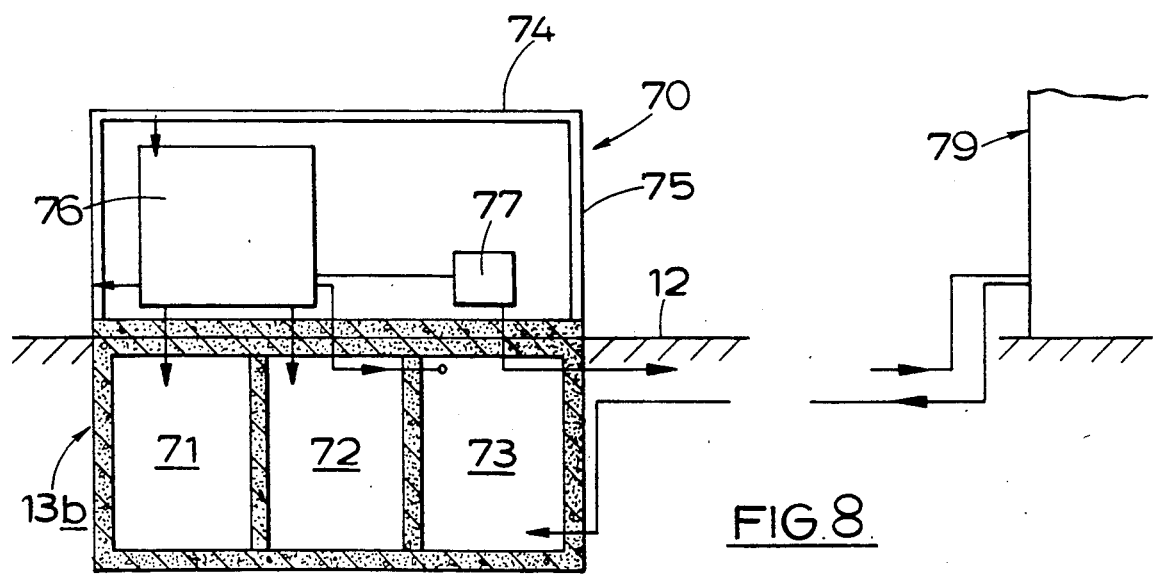

FIG. 8 illustrates a small -power pack- building 70 disposed on a foundation structure 13b defining water-filled chambers 71, 72, 73 serving as low (−5° C. to 30° C.), medium (30° C. to 45° C.), and high (50° C. to 55° C.) heat stores.

The building 70 has a water-filled, double-skinned roof 74 (corresponding to roof 25 of FIG. 1) and the walls 75 of the building incorporate water-filled panels as well. The building 70 houses an electrically-driven heat pump unit 76 and associated control unit 77. During night hours, when electricity charges are lower, the heat pump unit 76 is caused to transfer solar heated water originating from the roof and wall water spaces between the low 71 and medium 72 grade heat store chambers, and between the medium 72 and high 73 grade heat store chambers.

From the high grade heat store chamber 73, water is circulated through another, main building 79, for heating and domestic use, to return to the chamber 73.

The chambers 71, 82, 73 comprise enclosures formed in that part of the concrete foundation structure 13b of the building 70, disposed below the ground level 12.

Building 10 could be substituted for building 79, whereby heat is transferred from the building 70 to the water circulation system 18 (FIG. 3).

FIG. 10 illustrates a modification wherein relatively low, medium and high grade heat stores 170, 171, 172 respectively, are incorporated in the foundation 13a of a building 10a. The heat stores each comprise a plurality of small bore (say 20 mm) pipes 173 of plastics material, for example polyethylene, encapsulated in concrete 174. Load bearing insulation 175 may be provided if required.

Heat stores 170 and 172 have their flow and return pipes 176 embedded in the outer walls 11a of the building Heat store 171 has its flow and return pipes 176 embedded in a central wall 11b.

The pipes 176 are connected to a water flow system identical to system 18 of FIG. 3.

Where possible, any of the features disclosed herein may be substituted for, or added to, each other.

The water-filled structures exposed to solar heat, for example roof panels 15, 16, fence 64, roof 74, may be of any suitable material. They could for example, be of metal or, alternatively, of plastics material. If of metal, aluminium or steel are preferred.

I claim:

1. A building supported by a foundation structure, and provided with:
   (a) solar heated heat exchanger means,
   (b) heat store means disposed within the foundation structure,
   (c) a circulation system including heat pump means.
   (d) the system being operable to convey a heat transfer liquid around a plurality of paths, which paths connect the heat exchanger means with the heat store means,
   (e) the system constituting primary and secondary circulatory sub-systems,
   (f) each sub-system comprising:
      (i) a heat store separate from, and maintained at a temperature different from that of, the heat store of the other sub-system,
      (ii) conduit means interconnecting the two heat stores with said heat pump means whereby heat can be transferred between the heat stores, by transfer of said heat transfer liquid, from one heat store to the other heat store, and vice versa, and
      (iii) control means operable to control said heat transfer between the heat stores.

2. A building as claimed in claim 1, wherein the heat exchanger means comprise spaced-apart panels defining passageways for the flow of the heat transfer liquid.

3. A building as claimed in claim 2, wherein said panels comprise roof panels.

4. A building as claimed in claim 1, wherein the heat exchanger means comprise a panel covering a plurality of ducts, the ducts defining passageways for the flow of the heat transfer liquid.

5. A building as claimed in claim 4, wherein said panel comprises a roof panel.

6. A building as claimed in claim 1, wherein the foundation structure comprises a cementitious foundation structure.

7. A building as claimed in claim 1, wherein the heat store means comprise enclosures formed within the foundation structure.

8. A building as claimed in claim 1, wherein said foundation structure comprises a cementitious foundation structure, and wherein the heat store means further comprises the said cementitious foundation structure.

9. A building as claimed in claim 1, wherein the heat exchanger means further comprise at least one hollow structure disposed external to the building and connected to said circulation system, whereby said heat transfer liquid is caused to flow through said hollow structure, 10. A building as claimed in claim 1, wherein the heat exchanger means further comprise a fence-like structure of hollow form disposed external the building and connected to said circulation system, whereby said heat transfer liquid is caused to flow through said fence-like structure.

11. A building as claimed in claim 1, wherein the heat exchanger means further comprise a tubular structure inserted in the ground, external the building and connected to said circulation system, whereby said heat transfer liquid is caused to flow through said tubular structure.

12. A building as claimed in claim 1, further provided with a tertiary circulatory sub-system comprising:
   (i) a heat store separate from the heat stores of the primary and secondary circulatory sub-systems,
   (ii) conduit means interconnecting the tertiary heat store with the other two heat stores by way of said heat pump means, whereby heat can be transferred between all three heat stores, by transfer of said heat transfer liquid, and
   (iii) control means operable to control said heat transfer between the three heat stores.

13. A building as claimed in claim 12 wherein the three separate heat stores comprise relatively low, medium and high heat stores.

* * * * *